July 10, 1951  R. B. HOUPLAIN  2,559,960
SELF-LOCKING MECHANISM
Filed Feb. 26, 1946  2 Sheets-Sheet 1
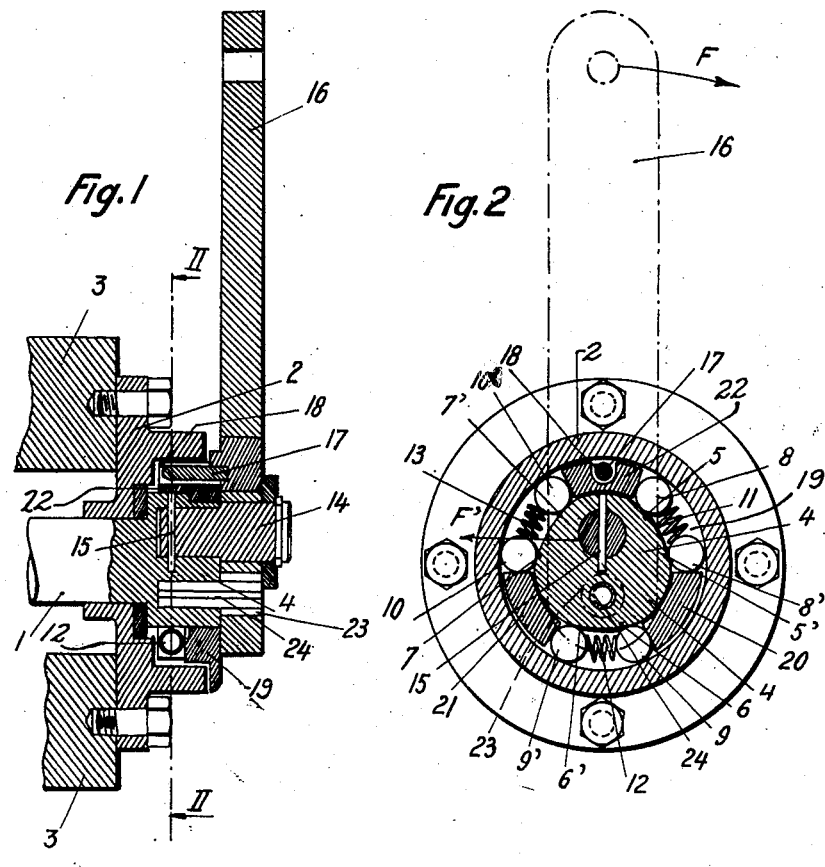
Inventor
R. Houplain
By Glascock Downing Seekly
Attys

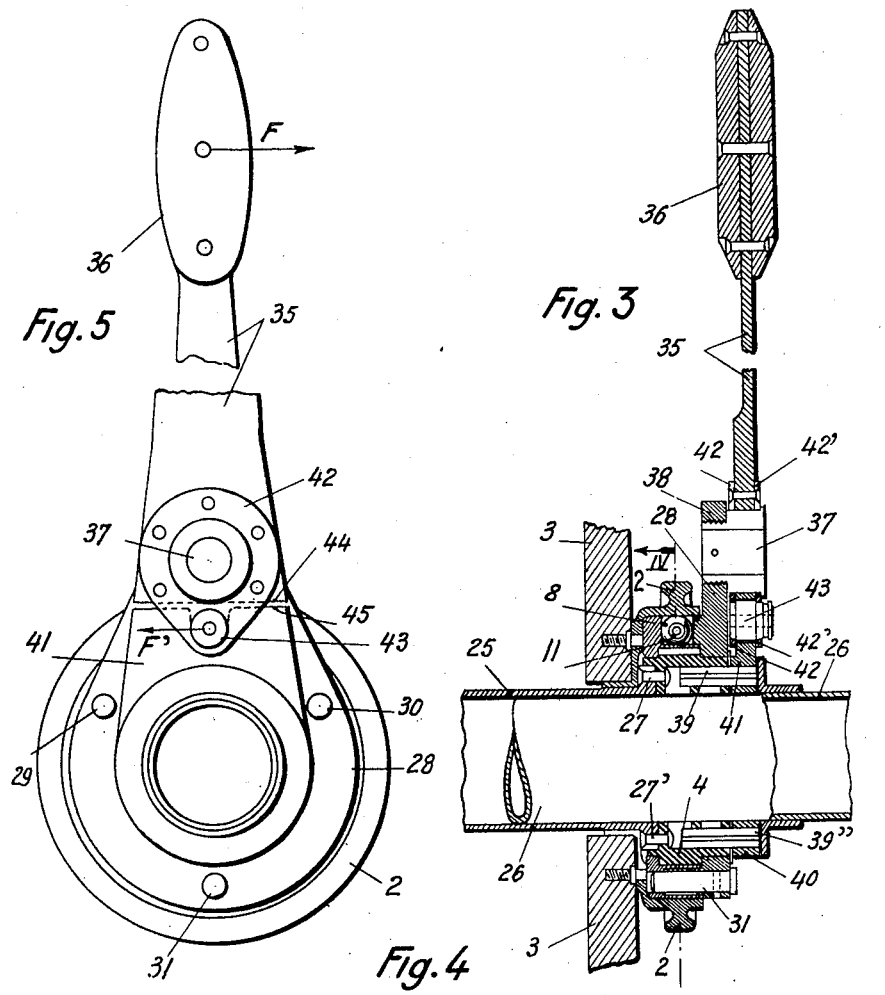

Patented July 10, 1951

2,559,960

UNITED STATES PATENT OFFICE 2,559,960

SELF-LOCKING MECHANISM

René Benjamin Houplain, Paris, France

Application February 26, 1946, Serial No. 650,278
In France September 24, 1940

Section 1, Public Law 690, August 8, 1946
Patent expires September 24, 1960

11 Claims. (Cl. 192—8)

The present invention refers to a self-locking control or driving mechanism in which a driven shaft is held against rotation in both directions as soon as the drive ceases to operate, by means of a wedging mechanism, consisting of a cam integral with or secured to this driven shaft and presenting on its periphery one or several pairs of inclined planes with opposite slopes or ramps cooperating with a corresponding pair or pairs of spring-loaded balls or rollers tending constantly to wedge themselves between said cam and a fixed reaction member, such as a drum coaxial with the driven member. In such known devices, the driving or control member is coupled with the driven or controlled member with a certain play allowing for an initial lost motion of the driving member which is utilized to unwedge said balls or rollers prior to the establishment of a positive coupling between said driving and driven members through the intermediation of unwedging means freely mounted on a cylindrical bearing surface of the cam.

However, if the driven shaft is submitted, during this lost motion of the driving member, to a force or torque independent from the driving power and tending to move the driven shaft in the same direction as this power, there is a tendency for said driven shaft to overrun the driving member which tends to a succession of short-lived rewedgings of the balls or rollers, so that the desired drive can only be accomplished by a series of successive wedgings and unwedgings producing shocks or jerks in the drive of the driven shaft. These shocks are particularly disadvantageous because each of said wedgings requires an unwedging force considerably higher than the wedging force. It results—in the case of a motor drive or transmission—that the motor is periodically overloaded, and that shocks and jerks occur in the transmission; while—in the case of manual drive there are difficulties due to the heavy loads involved.

The object of this invention is to improve the self-locking device of the type referred to and to eliminate said drawbacks by the provision of unwedging means producing a smooth and regular operation. Another object of the present invention is to provide a new arrangement of the wedging device facilitating the release of the wedging balls or rollers and avoiding the aforesaid shocks or jerks. According to the present invention, the wedging mechanism comprises a pivot-connection between the cam and the driving member with respect to the axis of rotation of said cam and to the fulcrum upon which bears momentarily the driving or controlling member during the unwedging of the balls or rollers so that when the driving member is actuated in a given direction a torque is applied in the center of said pivot connection tending to rotate the cam in the opposite direction.

Further objects and advantages of the invention will be described in more details in the following description and will be pointed out in the annexed claims in reference to the accompanying drawings, in which two embodiments of the invention are illustrated. On the drawings:

Figures 1 and 2 are sectional views, respectively in longitudinal section and in cross-section along line II—II of Figure 1, of the first of these embodiments;

Figures 3, 4 and 5 are respectively a longitudinal section, a cross-section along line IV—IV of Figure 3 and an end view or front elevation of the second of these embodiments.

In the first embodiment shown in Figures 1 and 2, the movable driven member consists of a rotating shaft 1, one end of which is rotatably mounted on a bearing 2 secured to a housing 3 and terminates in a multiple cam 4 presenting on its periphery three pairs of ramps or inclined surfaces 5—5', 6—6', 7—7' of opposed slopes. Three pairs of balls or rollers 8—8', 9—9', 10—10' are squeezed or jammed between these inclined surfaces and the inside periphery of a fixed drum integrally formed in and coaxial with the bearing 2 under the action of interposed springs 11, 12, 13, the arrangement being such that the balls 8, 9, 10 stop the cam 4 and consequently the shaft 1 when it tends to rotate in a clockwise direction, while the balls 8', 9', 10' stop it in the opposite direction. The profile of the cam 4 is such that the ramps of each pair of opposed inclined surfaces 5—5', 6—6' and 7—7' are symmetrical with respect to a plane passing through the longitudinal axis of the shaft 1 and of the cam 4.

The cam 4 is provided with a hole, the axis of which is parallel but distinct from this common longitudinal axis, in which is mounted the inner end of an eccentric axle or pivot 14, prevented from turning in that hole by means of a pin 15. On this axle or spindle 14 is pivoted a lever 16 constituting the driving member. This driving member or lever 16 carries a stud 17 engaged in a notch or groove 18, provided in a movable ring 19 freely mounted on a cylindrical hub of the cam 4 and including three projections 20, 21, 22 cooperating with the balls or rollers 8—8', 9—9' and 10—10' and constituting the unwedging members. On the opposite side of the stud 17, this driving member or lever 16 is provided with a hole 23 of relatively large diameter with respect to a flexible pin 24 of a relatively much smaller diameter, which is secured in a hole of the cam 4 provided on the opposite side of the axis of said cam with respect to the pivot 14. This pin 24 has preferably, as shown, the form of a flexible splint formed by a split tube. Lever 16 may be provided with a handle (not shown) for facilitating its manual operation. The difference between the lengths of the lever arms comprised, on the one hand, between the pivot 14 and the point of application of the driving force (upper end of the lever 16), and, on the other hand, between the said pivot 14 and the stud 17 is such that the resultant force applied on the balls or rollers 8—8', 9—9' and 10—10' by means of the unwedging members 20, 21 and 22 is a multiple of the force applied on this upper end of the lever 16. It is therefore advantageous to arrange, as shown, the pivot 14 as close as possible to the periphery of the cam 4.

The operation of this first embodiment of the control mechanism according to the invention is as follows: if the shaft 1 has to be manually driven clockwise, the lever 16 is operated in the same direction, i. e. in the direction of the arrow F. When thus turning clockwise about the pivot 14, thanks to the play of the pin 24 in the hole 23 of the lever 16, this latter does not act at once upon the cam 4 but, due to the substantial fit of the stud 17 into the notch 18, it starts almost immediately the rotation of the ring 19 in the same clockwise direction. The projections 20, 21, 22 of this ring 19 then push the balls or rollers 8, 9, 10 circularly in the clockwise direction away from their active wedging position, while on the pivot 14 (see Fig. 2) is simultaneously applied a reaction force F' which tends to move the cam 4 in a counter-clockwise direction, thus facilitating the unwedging of the balls or rollers 8, 9 and 10, this reaction force F' disappearing as soon as this unwedging has taken place. When the latter has been effected, the periphery of the hole 23 provided in the lever 16 contacts the pin 24 and the lever 16 starts to drive the cam 4 and consequently the driven shaft 1. As soon as the manual driving force ceases to act on the lever 16, the springs 11, 12, 13 re-jam the balls or rollers 8—8', 9—9' and 10—10' on the ramps 5, 6, 7, respectively 5', 6', 7' and lock the shaft 1 in both directions.

In the second embodiment shown in Figures 3, 4 and 5, specially designed for different uses in the aviation field, for instance for lifting the pilot's seat, the movable driven member consists of a tubular shaft 25, rotatably mounted on a fixed tubular support 26. On an end-collar of the driven shaft 25 is fixed, for instance by rivets 27, 27', a jamming cam 4 presenting, as in the preceding embodiment, pairs of opposed ramps 5—5', 6—6' and 7—7' cooperating with balls or rollers 8—8', 9—9' and 10—10', submitted to the action of interposed springs 11, 12 and 13, and acting between these ramps and a fixed drum 2 secured to a frame 3. A ring 28, rotatably mounted on a cylindrical hub of the cam 4, is secured to a second ring, likewise rotatably mounted on said cylindrical hub of the cam 4 by means of pins or rivets 29, 30, 31. This second ring presents axial projections 32, 33, 34 in the form of circular segments interposed between the three pairs of balls or rollers 10'—8, 8'—9 and 9'—10. These balls or rollers are freely mounted between these two rings in the three circular spaces between the fixed drum 2 and the active periphery of the cam 4 left between these three segments 32, 33, 34 and are automatically retained in their active wedging position by the action of the springs 11, 12, 13 after each unwedging as soon as a driving lever 35, provided with a handle 36, is released. This lever 35 is pivoted on a pin 37 secured to and projecting from a radial projection 38 of the ring 28 (Figure 3). On the other hand, there is fixed on this cam 4, preferably by means of flexible pins 39, 39'' formed by split tubes, a ring 40 provided also with radial projection 41 (Figures 3 and 5). The end of this latter is provided with a notch in which is engaged a pin 43 carried by two extension plates 42 and 42' forming the inner end of the control lever 35. The lower edge 44 of the body of the lever 35 is flat and straight and it faces at a very small distance the upper edge 45, equally flat and straight, of the radial projection 41 of the ring 40 secured to the cam 4 (Fig. 5).

The control mechanism of the invention in this second embodiment operates as follows: When the operator moves the lever 35 in the direction of the arrow F of Fig. 5—even if the driven shaft 25 is submitted to a force tending to make it rotate in the same clockwise direction—this lever 35 pivots about the axis of the pin 43 then immobilized due to the fact that the cam 4 is still normally locked by the wedging action of the balls. Thereby, the lever 35 moves clockwise the ring 28 and consequently the segments 32, 33 and 34 which latter then effect the unwedging of the balls or rollers 8, 9 and 10. As in the previous case, this unwedging operation is facilitated by the fact that, simultaneously to the force applied on the balls or rollers 8, 9, 10 in a clockwise direction, there is applied by the pin 43 on the projection 41 and the cam 4 a reaction force in a counter-clockwise direction, which tends to move the cam 4 in a direction opposite to that of the ring 28. As soon as the release of the cam 4 is thus effected, the lever 35 reaches a position (in pivoting about the axis of the pin 43) in which its straight lower edge 44 bears by its right hand corner upon the upper edge of the radial projection 41 of the ring 40 fixed on the cam 4. The lever 35 is thence stopped from moving angularly further with respect to the cam 4 and henceforth every further angular motion in a clockwise direction imparted to the lever 35 is directly transmitted to the driven shaft 25.

It is obvious, that in this second embodiment—due to the leverage ratio between the active length of the lever 35 and of the distance between the axes of respectively the pivot-pins 37 and 43—the total unwedging force applied on the balls or rollers 8, 9, 10 by the segments 32, 33, 34 is a multiple of the force applied manually on the lever 35.

It is to be understood that in the two embodiments of the invention just described, the driving member 16 or 35, instead of being manually operated, could be rotated by a driving shaft rotatably mounted in alignment with the driven shaft 1 or 25. In such cases, it is sufficient to provide a coupling between this driving shaft and the lever 16 or 35 by a finger or another appropriate coupling device.

What I claim is:

1. An irreversible driving device for rotating a driven shaft and locking the shaft from movement in either direction as soon as driving power ceases including, a driven shaft, a cam member carried by said shaft and having at least one pair of opposed slopes thereon, a stationary annular reaction surface spacedly surrounding said cam, rolling contact wedging means disposed between the periphery of said cam and the reaction surface, an unwedging member including means projecting into the path of movement of and acting on said wedging means to release the same, a driving member controlling said unwedging member and connections at spaced points respectively between the driving member and the cam member and the driving member and the unwedging member, one of said connections comprising a pin carried by one member and a notch provided on the other member and the other connection comprising a pivotal connection with the axis of pivotation being eccentrically disposed with respect to the axis of the cam.

2. An irreversible driving device for rotating a driven shaft and locking the shaft from movement in either direction as soon as driving power ceases including, a driven shaft, a cam carried by said shaft and having a plurality of pairs of oppositely inclined slopes thereon, a fixed annular member surrounding the periphery of the cam in spaced relation and providing a stationary reaction surface on its inner periphery, a plurality of pairs of rolling contact wedging members disposed between the peripheries of the cam and the said reaction surface, resilient means interposed between the respective members of each pair of wedging members to normally urge them into locking position, a rotatable ring concentrically surrounding the axis of the cam and having a plurality of longitudinally extending segmentally shaped projections extending into the space between the cam and the stationary reaction surface and separating the pairs of wedging members, a driving member, and operative connections between the driving member and the cam and the driving member and the said ring including a clearance coupling between the driving member and the cam and a drive connection between the driving member and said ring, said connections being operative upon swinging movement of the driving member to rotate the ring in one direction to release the wedging members and simultaneously apply a torque tending to rotate the driven shaft in the opposite direction when said shaft is locked but operable to rotate said shaft in the same direction as said ring after the unwedging action.

3. An irreversible driving device for rotating a driven shaft and locking the shaft from movement in either direction as soon as the driving power ceases including, a shaft to be driven, a cam carried by said shaft and having at least one pair of opposed slopes thereon, a fixed annular member spacedly surrounding the cam and concentric with the axis thereof, the inner periphery of which constitutes a stationary reaction surface, rolling contact wedging members interposed between the cam slopes and the said reaction surface, unwedging means acting on said wedging means, a driving member eccentrically connected with and controlling said unwedging means, a clearance coupling between the driving member and the cam for applying power to the shaft after release of the wedging action and a pivotal connection between the driving member and the cam, the axis of pivotation of which is eccentrically disposed with respect to the axis of the cam.

4. An irreversible driving device for rotating a driven shaft and locking the shaft from movement in either direction as soon as the driving power ceases including, a shaft to be driven, a cam carried by said shaft and having a plurality of pairs of opposed slopes thereon, a stationary annular member spacedly surrounding said cam and concentric with the axis thereof and the inner periphery of which constitutes a stationary reaction surface, a plurality of pairs of rolling contact wedging members disposed between the periphery of the cam and the reaction surface, a rotatable annular unwedging member concentrically surrounding the shaft and including a plurality of segmentally shaped longitudinally extending projections disposed in the space between the periphery of the cam and the reaction surface and separating the pairs of wedging members, resilient means interposed between the members of each pair of wedging members normally urging the same to wedging contact, a driving member controlling the movement of said rotatable unwedging member, a flexible pin carried by the cam and projecting longitudinally with the axis thereof, said driving member having an aperture therein having a diameter larger than the diameter of the pin, which aperture receives the pin to provide a lost motion coupling between the driving member and the cam, an eccentric pivot connection between the driving member and the cam, one of said segmental projections having a transverse notch in the periphery thereof, and a pin carried by the driving member disposed in the notch, all of said connections being disposed in the same transverse plane through the device whereby rotation of the driving member effects unwedging of the wedging members moving them in one direction and applying a torque to the center of the pivotal connection between the driving member and the cam tending to rotate the cam in the opposite direction.

5. An irreversible driving device for rotating a driven shaft and locking the shaft from movement in either direction as soon as the driving power ceases including, a tubular driven shaft, a cam carried by said shaft having a plurality of pairs of opposed slopes thereon, a fixed drum concentrically surrounding the shaft adjacent the cam, the inner periphery of said drum constituting a fixed reaction surface, a cylindrical hub on the cam, a ring rotatable on said hub, a second ring rotatable on said hub and secured to the first mentioned ring, said second ring having a plurality of axially extending segmental projections disposed in the space between the periphery of the cam and the inner periphery of the drum, a plurality of pairs of rolling contact wedging members disposed in the said space between the end faces of the respective segmental projections, spring means interposed between the members of each pair of wedging members, said first mentioned ring having a radial projection, a driving lever pivotally connected to said radial projection, a third ring fixed to the cam and having a radial projection in alignment with said first mentioned radial projection and having a transverse notch in the periphery thereof, a pin carried by said lever disposed in the notch providing an eccentric pivotal connection between the lever and the cam, whereby the swinging movement of the lever rotates the ring carrying the segmental projections in one direction and simultaneously applies through the said pin and notch connection a torque tending to rotate the cam in the opposite direction.

6. Self-locking mechanism of the type described comprising in combination with a fixed support having a cylindrical reaction surface: a driven shaft pivoted in said support coaxially with said surface; a cam carried coaxially by said shaft, a cylindrical hub portion adjacent the cam; an annular unwedging member freely mounted on said cylindrical portion and provided with three spaced segments interposed between said fixed reaction surface and the periphery of said cam; three pairs of rolling contact wedging means disposed in the annular spaces between said segments so as to cooperate with said cam and said reaction surface; three springs respectively interposed between the wedging means of each pair so as to normally press said means into their active wedging position; a driving lever eccentrically connected with said cam; and an eccentric connection between the unwedging member and said lever the axis of which is located between the axis of the eccentric connection of the lever with the cam and the free extremity of said lever.

7. Self-locking mechanism comprising: a driven member movable in two opposite directions; a multiple cam carried by said driven member; a fixed reaction surface cooperating with said cam; rolling wedging members freely mounted between said cam and said fixed surface; a driving member for positively moving the driven member in either direction; unwedging members movable with said driving member; a pin-and-slot connection and an eccentric pivot connection between said driving member and said cam, said pin-and-slot connection allowing for a slight lost motion of the driving member; the geometrical arrangement of these two connections with respect to the point of application of power on the driving member being such that any power applied on said point tends first to move the cam and the unwedging members in opposite directions during this lost motion, and then drives positively the cam; said unwedging members and the driven member in the direction of its own movement.

8. Self-locking mechanism comprising: a rotatable driven shaft; a multiple cam carried by said driven shaft and provided with a cylindrical bearing surface; a fixed cylindrical reaction surface surrounding the periphery of said cam and spaced therefrom; pairs of rolling wedging members freely mounted in the annular space between said cam and said reaction surface; a driving lever for positively turning the driven shaft in either direction; a ring freely mounted on said cylindrical bearing surface and carrying unwedging segments interposed between the two rolling wedging members of each pair; an eccentric pivot connection between said ring and the driving lever; and a loose eccentric pivot connection between the cam and the driving lever allowing for a slight lost motion thereof; the geometrical arrangement of these two pivot connections with respect to the outer end of the driving lever being such that any power applied on said outer end tends first to move the cam and said ring in opposite directions during this lost motion, and then drives positively the cam, the ring and the driven shaft in the direction of its own movement.

9. Self-locking mechanism according to claim 6, in which the driving lever is constituted by a floating lever having a virtual fulcrum located between its eccentric connection to the unwedging member and its eccentric connection to the cam so as to tend to rotate said cam and said unwedging member in opposite direction.

10. Self-locking mechanism according to claim 1, in which the driving member is constituted by a broken lever including two parts one part being eccentrically pivoted to the cam and the other part eccentrically pivoted to the unwedging member; each part terminating in a flat end and the respective ends facing each other in slightly spaced relation to provide a small transversal gap between the parts.

11. Self-locking mechanism according to claim 3, in which a pin-and-slot connection is provided between the driving member and the cam comprising a flexible tubular pin comprising a split tube eccentrically secured to the cam and the driving member having a circular opening provided therein opposite to and in alignment with said pin and having a diameter substantially larger than the diameter of said pin.

RENÉ BENJAMIN HOUPLAIN.

REFERENCES CITED

The following references are of record in the file of this patent:

UNITED STATES PATENTS

| Number | Name | Date |
|---|---|---|
| 403,562 | Stickney | May 21, 1889 |
| 814,301 | Kunz | Mar. 6, 1906 |
| 1,015,861 | Warner | Jan. 30, 1912 |
| 1,211,550 | Cuff | Jan. 9, 1917 |
| 1,889,295 | Rosatelli | Nov. 29, 1932 |
| 2,350,156 | Dean et al | May 30, 1944 |
| 2,427,103 | Hettinga | Sept. 9, 1947 |

FOREIGN PATENTS

| Number | Name | Date |
|---|---|---|
| 565,023 | Germany | Nov. 25, 1932 |